US012802964B2

(12) United States Patent
Kleine Wächter et al.

(10) Patent No.: US 12,802,964 B2
(45) Date of Patent: Nov. 17, 2026

(54) LAMINATING DEVICE FOR LAMINATING MULTILAYER ENDLESS WEBS FOR PRODUCING ENERGY CELLS

(71) Applicant: KÖRBER TECHNOLOGIES GMBH, Hamburg (DE)

(72) Inventors: Michael Kleine Wächter, Lankau (DE); Manfred Folger, Hamburg (DE); Dennis Springborn, Hamburg (DE); Niko Rossfeldt, Börnsen (DE); Marco El Gendy, Bargteheide (DE)

(73) Assignee: KÖRBER TECHNOLOGIES GMBH, Hamburg (DE)

( * ) Notice: Subject to any disclaimer, the term of this patent is extended or adjusted under 35 U.S.C. 154(b) by 26 days.

(21) Appl. No.: 19/123,090

(22) PCT Filed: Oct. 17, 2023

(86) PCT No.: PCT/EP2023/078819

§ 371 (c)(1),
(2) Date: Apr. 22, 2025

(87) PCT Pub. No.: WO2024/088827

PCT Pub. Date: May 2, 2024

(65) Prior Publication Data

US 2026/0081135 A1 Mar. 19, 2026

(30) Foreign Application Priority Data

Oct. 25, 2022 (DE) ..................... 10 2022 128 220.1

(51) Int. Cl.
*H01M 4/04* (2006.01)

(52) U.S. Cl.
CPC ................................ *H01M 4/0435* (2013.01)

(58) Field of Classification Search
CPC ........... H01M 4/0435; H01M 10/0468; H01M 10/0413; H01M 50/46; Y02P 70/50; B30B 3/005; B30B 3/04; B30B 15/34
USPC ...................................................... 156/583.1
See application file for complete search history.

(56) References Cited

U.S. PATENT DOCUMENTS

| | | | | |
|---|---|---|---|---|
| 11,302,902 | B2 * | 4/2022 | Choi | H01M 10/0525 |
| 2016/0276712 | A1 | 9/2016 | Sale et al. | |
| 2022/0006161 | A1 | 1/2022 | Kim et al. | |
| 2022/0302505 | A1 | 9/2022 | Kinoshita et al. | |

FOREIGN PATENT DOCUMENTS

| | | | |
|---|---|---|---|
| CN | 110797564 | A | 2/2020 |
| CN | 211700456 | U | 10/2020 |
| DE | 102021206617 | B3 | 9/2022 |
| EP | 3069407 | B1 | 9/2016 |

(Continued)

*Primary Examiner* — James D Sells
(74) *Attorney, Agent, or Firm* — SALIWANCHIK, LLOYD & EISENSCHENK

(57) ABSTRACT

The invention relates to a laminating apparatus for a multilayer continuous web composed of at least one separator web and at least one electrode for producing energy cells, with a pressing device which laminates the multilayer continuous web by exerting a compressive force, wherein the pressing device has two pressing surfaces, with which it comes into contact with different sides of the continuous web, and the pressing surfaces are temperature-controlled differently.

18 Claims, 2 Drawing Sheets

(56) References Cited

FOREIGN PATENT DOCUMENTS

| | | | |
|---|---|---|---|
| EP | 3866243 | A1 | 8/2021 |
| EP | 4027421 | A1 | 7/2022 |
| JP | 2007227666 | A | 9/2007 |
| KR | 1020140130929 | A | 11/2014 |
| KR | 20210120731 | A | 10/2021 |

* cited by examiner

LAMINATING DEVICE FOR LAMINATING MULTILAYER ENDLESS WEBS FOR PRODUCING ENERGY CELLS

CROSS REFERENCE TO RELATED APPLICATIONS

This application is a National Stage Application of International Application Number PCT/EP2023/078819, filed Oct. 17, 2023, which claims priority to German Patent Application No. 10 2022 128 220.1, filed Oct. 25, 2022.

FIELD OF THE INVENTION

The present invention relates to a laminating apparatus for laminating multilayer continuous webs for producing energy cells having the features of the preamble of claim 1.

BACKGROUND OF THE INVENTION

Energy cells or energy storage devices within the meaning of the invention are used, for example, in motor vehicles, other land vehicles, ships, aircraft or also in stationary systems such as photovoltaic systems, in the form of battery cells or fuel cells in which very large amounts of energy have to be stored over longer periods of time.

For this purpose, such energy cells may have a structure consisting of a plurality of segments stacked to form a stack. These segments are each formed from alternating anode sheets and cathode sheets, which are separated from each other by separator sheets that are also produced as segments. The segments are pre-cut in the production process and then placed on top of each other in the predetermined sequence to form the stacks and joined together by lamination. The anode sheets and cathode sheets are first cut from a continuous web and then placed individually at intervals on a continuous web of separator material. This subsequently formed "two-ply" continuous web made of the separator material with the anode sheets or cathode sheets placed on top is then cut into segments again in a second step by means of a cutting apparatus, wherein the segments in this case are formed in a double layer by a separator sheet with an anode sheet or cathode sheet arranged on top. If this is technically feasible or necessary from a manufacturing perspective, the continuous webs of separator material with the anode sheets and cathode sheets placed on top of each other can also be placed on top of each other before cutting, so that a continuous web is formed with a first continuous layer of separator material with anode sheets or cathode sheets placed thereon and a second continuous layer of separator material with anode sheets or cathode sheets placed thereon. This "four-ply" continuous web is then cut into segments by means of a cutting apparatus, which segments are in this case formed in four layers with a first separator sheet, an anode sheet, a second separator sheet and a cathode sheet lying thereon. The advantage of this solution is that one cut can be saved. Furthermore, the cut electrodes can also be placed on a continuous separator web and stacked on top of each other by another continuous separator web to form a three-ply continuous web, from which three-ply segments with a separator sheet, an electrode sheet and another separator sheet are then cut. "Segments" within the meaning of this invention are therefore single-ply segments of a separator material, anode material or cathode material, or also two-ply, three-ply or four-ply segments of the structure described above.

Furthermore, the "two-ply" or "four-ply" continuous webs described above can also be supplemented by placing another separator web on the electrodes to form a "three-ply" or "five-ply" continuous web, which then has a separator web on both sides.

Alternatively, the electrodes can also be provided as continuous webs, i.e., uncut in the "two-ply," "three-ply," "four-ply" or "five-ply" continuous webs, which are then cut to considerably longer lengths and then wound up, for example. Alternatively, the continuous webs can be wound first and then cut after winding is complete. In this case, the electrodes in the continuous webs are not present as spaced segments, but instead in a single segment that extends without interruption in the intermediate space between the separator webs.

Furthermore, an electrode in the form of a copper web or copper foil or a comparable carrier material with an intermittent coating can also be provided in the continuous web, in which the coatings each form sectional, spaced apart elevations in the electrode.

To laminate the "two-ply," "three-ply," "four-ply" or "five-ply" continuous webs, they are passed between two pressing devices which exert a compressive force on the continuous webs. The electrodes are compressed with the separator webs in these continuous webs. In principle, the electrodes are connected and laminated to the separator webs using a pressing device by exerting a compressive force. In addition, lamination can be assisted by the generation of heat as a result of the compressive force. Furthermore, additional heating or cooling zones can be provided which regulate the temperature of the continuous webs during lamination. In order to achieve a high-quality connection, it is desirable that the continuous webs are exposed to as equal a compressive force as possible over their longitudinal and transverse extension.

One problem in this case is that the electrodes and the separator material are made of materials with different thermal expansion coefficients, so that the continuous web after lamination and/or the segments cut from it are subsequently curved and/or can have a wavy shape.

BRIEF SUMMARY OF THE INVENTION

Against this background, the invention is based on the object of creating a laminating apparatus which allows for lamination of the continuous webs and the segments cut therefrom having a reduced wavy shape and curvature.

According to the invention, a laminating apparatus having the features of claim 1 is proposed to achieve the object. Further preferred developments can be found in the dependent claims, the figures, and the associated description.

DETAILED DESCRIPTION

According to the basic concept of the invention, it is proposed according to claim 1 that the pressing device has two pressing surfaces, with which it comes into contact with different sides of the continuous web, and the pressing surfaces are temperature-controlled differently.

Due to the different temperature control of the pressing surfaces, the heat input during lamination into the two different surfaces of the continuous web can be configured differently. In this way, the temperature-related different deformation of the continuous web can at least be reduced by deliberately heating or even cooling the continuous web to a lesser extent on the side with the greater temperature-related expansion. Alternatively, the side of the continuous web with the lower temperature-related expansion can also be deliberately heated more strongly. All that is important is that the continuous web is laminated having a temperature gradient between the two surfaces which is inverse to the different temperature-related expansions of the continuous web on its two surfaces. Additionally or alternatively, the pressing surfaces can also be designed in such a way that they are each individually temperature-controlled differently, i.e., have warmer zones and colder zones, so that different thermal expansions due to different thermal expansion coefficients of the continuous web on a surface can be compensated along its longitudinal extension. Furthermore, the lamination of the continuous web as such can be adapted along the continuous web, for example by heating zones of the continuous web which require greater heat for optimal lamination more strongly than the zones which can already be sufficiently well laminated at a lower temperature. Furthermore, zones of the continuous web for which excessive heat during lamination is detrimental can thereby be deliberately not heated or heated to a lower temperature. As a result, the continuous web can be laminated with less waviness or curvature, using the solution according to the invention. Furthermore, the lamination of the continuous web can be adapted to the different thermal expansion coefficients in the surfaces and the different conditions for lamination as such by individually controlling the temperature of the pressing surfaces, so that lamination of the continuous web with a much more homogeneous connection of the separator webs and the electrode(s) is possible.

It is further proposed that a plurality of electrodes arranged at regular intervals from each other are provided in the continuous web. Due to the electrodes arranged at intervals, the continuous web has different thermal expansion coefficients in the direction of its surface and in particular in the direction of its longitudinal extension in the transport direction, so that the problem of different thermal expansions is particularly great here, and the advantage according to the invention is particularly evident.

It is further proposed that the continuous web has at least two separator webs, and the electrodes are formed by a plurality of anodes arranged in series and a plurality of cathodes arranged in series, which are separated from one another by one of the separator webs, the pressing surface which comes into contact on the side of the continuous web assigned to the cathodes having a lower temperature than the pressing surface which comes to bear on the side of the continuous web associated with the anodes. The proposed development allows the continuous web to be laminated with a lower heat input into the cathode side, so that the greater thermal expansion of the cathodes can be at least partially compensated and the cathode side of the continuous web ideally deforms identically to the anode side of the continuous web due to heat.

Cathodes usually have a conductor foil made of aluminum or an aluminum alloy. In contrast, anodes usually have a conductor foil made of copper or a copper alloy. The thermal expansion coefficient of aluminum or an aluminum alloy is generally higher than the thermal expansion coefficient of copper or a copper alloy, which increases the thermal expansion of the cathode compared to the anode.

In this case, it has proven advantageous if the pressing surfaces have a temperature of −40 to 150 degrees Celsius, preferably 55 to 80 degrees Celsius, the pressing surfaces preferably having a temperature difference of 20 to 60 degrees Celsius, preferably 35-45 degrees Celsius. This makes it possible in particular to compensate for the different thermal expansion when using Cu and Al.

It is further proposed that individually temperature-controllable heating segments or cooling segments be provided in the pressing surfaces. The heating or cooling segments allow the temperatures of the pressing surfaces to be changed individually and/or locally, the temperature gradients between the two pressing surfaces and/or along the respective pressing surfaces being able to be individually changed as a result. In this case, the temperature gradients are purposely adjusted to take into account the different temperature expansions of the continuous web at its various surfaces and/or along the corresponding surface.

Furthermore, the pressing surfaces can also have different thermal conductivity coefficients. This allows a central or identical heat source or heat sink to be used, and the different temperatures of the pressing surfaces are achieved by the different heat conductions caused by the different thermal conductivity coefficients of the pressing surfaces. The pressing surfaces therefore have different thermal conductivities.

Furthermore, the pressing surfaces can have different heat capacities, so that the introduced heat results in different temperatures of the pressing surfaces because the heat is stored differently.

It is further proposed that the pressing device comprises two pressing rollers with a circular cross section, and the pressing surfaces are formed by the lateral surfaces of the pressing rollers. By designing the pressing device of the laminating apparatus as pressing rollers, the laminating device can be particularly easily integrated into a drum run, which in turn is characterized by a particularly high production capacity and/or transport speed of the continuous web.

It is further proposed that the pressing rollers are arranged such that a gap is provided between their lateral surfaces, through which the continuous web runs, the gap having a gap width which is smaller than the thickness of the continuous web. The proposed solution slightly compresses the continuous web simply by the arrangement of the pressing rollers for lamination. This eliminates the need for additional feed movements of the pressing rollers.

In this case, the pressing rollers are preferably cylindrical with an identical diameter in the direction of their longitudinal axis. The pressing rollers are thus designed in such a way that their lateral surfaces are circular in a plane running perpendicularly through the axis of rotation and are aligned in their longitudinal extensions in the direction of the axes of rotation parallel to the axes of rotation. The two lateral surfaces thus form a gap between themselves with a gap width that is constant along its longitudinal extension and is independent of the angle of rotation of the pressing rollers.

This results in a particularly simple construction of the laminating apparatus in that the pressing rollers are arranged in such a way that their axes of rotation are aligned parallel to each other. Due to the parallel arrangement of the axes of rotation, the pressing rollers can be coupled particularly easily with corresponding individual drive devices, the individual drive devices being able to be mounted on a common machine frame, for example. Furthermore, the pressing rollers can thereby be coupled particularly easily by means of a transmission, e.g., in the form of a gear transmission with a plurality of gears arranged in a plane relative to one another.

It is further proposed that the pressing device has at least one pressing belt, and the pressing surface is formed by a surface of the pressing belt which comes into contact with one of the surfaces of the continuous web. The pressing belt can be used to equalize the pressing force acting on the continuous web. In this case, the pressing belt can preferably have an identical or larger width transversely to the transport direction of the continuous web so that the continuous web is subjected to the pressing force over its entire width and is thus laminated. The pressing belt can be designed in such a way that it generates the compressive force itself or is subjected to a compressive force via a separate pressure-generating device such as a press roller. In the latter case, the compressive force is transferred from the pressing belt to the continuous web. The pressing belt itself can be designed in the form of a flexible fiber-reinforced textile belt, a steel belt or a very fine link chain or the like. The pressing belt can be designed as a driven continuous belt or as a stationary pressing belt with a friction-reduced surface. If the pressing belt is designed as a driven continuous belt, it can also be used to transport the continuous web. However, if the pressing belt is formed by a stationary pressing belt, an additional device is required to transport the continuous web. In this case, the continuous web is actively pulled past the pressing belt.

It is further proposed that at least two pressing belts, each with a pressing surface, are provided. The total pressing surface can be increased by using a plurality of pressing belts. If the pressing belts are arranged in series, the length of the pressing surface can be increased thereby, while if the pressing belts are arranged in parallel, the width of the pressing surface can be increased. Furthermore, by arranging the pressing belts spaced apart from one another, a gap can be created, through which the continuous web can be guided for lamination. In this case, the continuous web can be compressed from both sides, so that the continuous web is laminated on both of its surfaces.

If the pressing device has pressing rollers, it is further proposed that these rest on the free surface of the pressing belts and press the pressing belts against the continuous web by exerting a compressive force. In this case, the pressing rollers form a pressure-generating device of the pressing device, which presses the pressing belts against the continuous web.

It is also proposed that the pressing surface be adjustable in its width. Due to the adjustability of the width of the pressing surface, the laminating apparatus can be set to laminate continuous webs of different widths. The width of the pressing surface is the perpendicular direction to the longitudinal direction of the continuous web in the plane of the continuous web.

Furthermore, the pressing surface can preferably have a width which corresponds to the width of the continuous web or a multiple thereof. The proposed solution means that the laminating apparatus is specifically designed to laminate a continuous web of a specific width, or a plurality of continuous webs of a specific width can also be laminated in a parallel arrangement. If the pressing surface is adjustable, predetermined positions of the widths of the pressing surface can also be provided for this purpose, so that the pressing surface can be adjusted with little effort from a position for laminating a single continuous web to a position for two or more continuous webs arranged in parallel.

BRIEF DESCRIPTION OF THE FIGURES

The invention is explained below using preferred embodiments with reference to the accompanying figures, in which:

FIG. 1 shows a detail of a laminating apparatus according to the invention, in which the continuous web 3 is formed by a "four-ply" continuous web 3 with a separator web 4 on the upper side and a separator web 6 in the middle, a plurality of anodes 5 arranged between the separator webs 4 and 6, and a plurality of cathodes 7 arranged under the central separator web 6. The anodes 5 are larger than the cathodes 7, so that the anodes 5, when arranged in pairs with the cathodes 7, have a smaller frontal interval A from each other than the cathodes 7. The laminating apparatus further comprises a pressing device with two pressing rollers 1 and 2, which are designed as cylindrical drums with a circular cross section. The pressing rollers 1 and 2 are aligned with their axes of rotation parallel to each other and arranged such that there is a gap S between their lateral surfaces 12 and 13 with a gap width SW that is constant in the direction of the axes of rotation, i.e., perpendicularly to the plane of representation.

Figure 1:
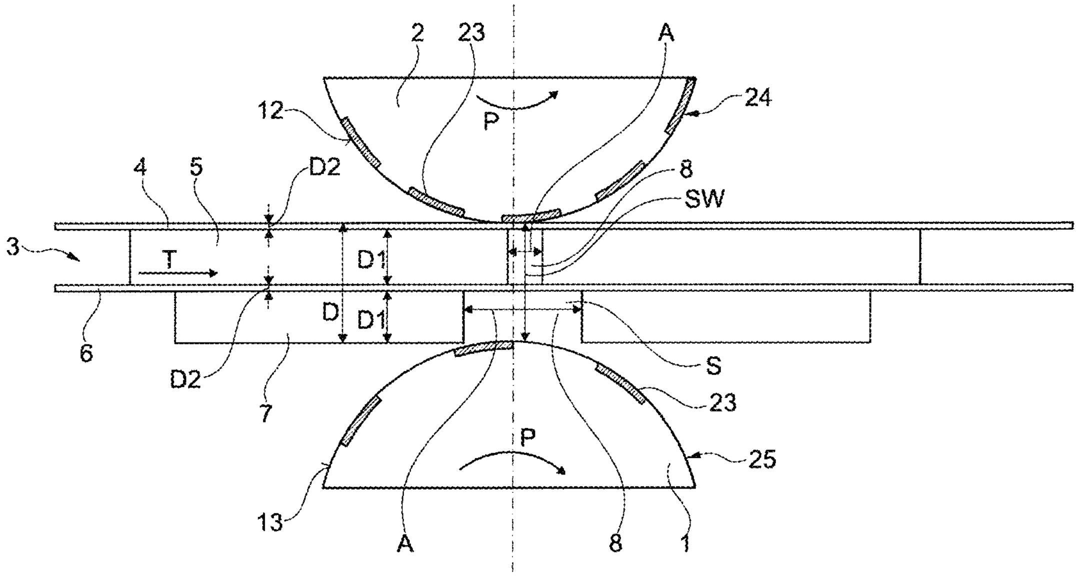
FIG. 1 shows a detail of a laminating apparatus with a four-ply continuous web and a pressing apparatus with two pressing rollers.

The gap width SW of the gap S is smaller than the thickness D of the continuous web 3, so that the continuous web 3 is slightly compressed and laminated when passing through the gap S. The thickness D2 of the separator webs 4 and 6 is in each case 15 to 25 μm, while the anodes 5 and the cathodes 7 have a thickness D1 of 150 to 400 μm. This results in a thickness D of the continuous web 3 of approximately 330 μm to 850 μm. The gap width SW is dimensioned to be smaller by 20 to 100 μm, preferably 40 to 60 μm, than the thickness D of the continuous web 3, so that the continuous web 3 is slightly compressed when passing through the gap. The intermediate spaces 8 are formed by the spacing of the anodes 5 and the cathodes 7, and have a height which corresponds to the thickness D1 of the anodes 5 and the cathodes 7, i.e., 150 to 400 μm. Furthermore, the intermediate spaces 8 have a length in the transport direction corresponding to the spacing A of the electrodes 5 of 3 mm between the anodes and 6 mm between the cathodes, wherein it is desirable to make the spacings A between the electrodes 5 dimensioned to be as small as possible in order to increase the material utilization rate of the continuous web 3 and the number of electrodes 5 in a predetermined length of the continuous web 3.

The continuous web 3 is fed in the feed direction T and pulled through the gap S. The pressing rollers 1 and 2 can themselves be actively driven, for example by individual drives in the form of servo motors, to rotate in opposite directions in the direction of the arrows P, so that they also actively transport the continuous web 3 through the frictional connection. Alternatively, the pressing rollers 1 and 2 can also be mounted so that they can only rotate, so that they themselves are driven by the continuous web 3 through the frictional connection to the rotary movements. In this case, the pressing rollers 1 and 2 roll only passively on the surfaces of the continuous web 3. Due to the passive rolling movement of the pressing rollers 1 and 2, their movement is synchronized with that of the continuous web 3.

The upper pressing roller 2 rests with its lateral surface 12 on the upper side of the separator web 4 and thus forms an upper pressing surface 24. The lower pressing roller 1 rests with its lateral surface 13 on the surfaces of the cathodes 7, so that the lateral surface 13 in this case forms a lower pressing surface 25 opposite the upper pressing surface 24. The pressing rollers 1 and 2 thus rest with their pressing surfaces 24 and 25, formed by the lateral surfaces 12 and 13, on the free surfaces of the continuous web 3 and, as the continuous web 3 passes through the gap S, exert a compressive force on the continuous web 3 from both sides due to the smaller gap width SW in relation to the thickness D of the continuous web 3, which causes the lamination of the continuous web 3.

Figure 2:
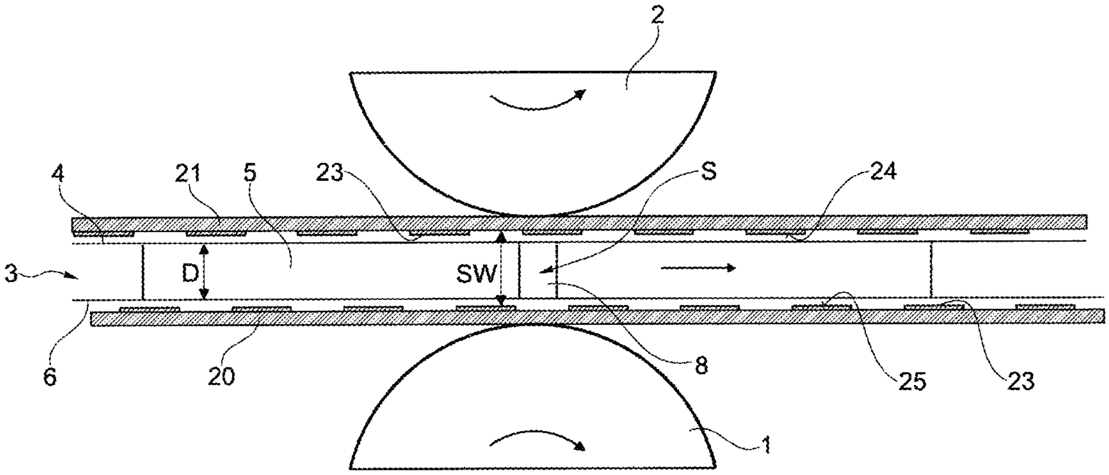
FIG. 2 shows a detail of a laminating apparatus with a three-ply continuous web and a pressing apparatus with two pressing rollers and two pressing belts.

FIG. 2 shows an alternative embodiment of the invention. In addition to the two pressing rollers 1 and 2, the pressing device here also comprises two pressing belts 20 and 21, which rest on the upper side and the lower side of the continuous web 3. The pressing rollers 1 and 2 are designed and arranged here identically to the pressing rollers 1 and 2 of FIG. 1, and differ only in that they do not lie directly on the continuous web 3 to be laminated, but instead on the free surfaces of the pressing belts 20 and 21, which in turn lie on the continuous web 3. Thus, the pressing surfaces 24 and 25 are formed by the surfaces of the pressing belts 20 and 21 facing the continuous web 3. The gap S is thus formed by the intermediate space between the two pressing surfaces 24 and 25 of the pressing belts, and the gap width SW corresponds to the spacing between the two pressing surfaces 24 and 25. The pressing belts 20 and 21 are dimensioned such that the gap width SW is smaller than the thickness of the continuous web D. The thickness D of the continuous web 3 in this case is 180 to 450 μm. This does not correspond to the representation in FIG. 2, in which the gap width SW is shown larger than the thickness D of the continuous web 3 for the sake of better visibility. However, in order to laminate the continuous web 3, the pressing belts 20 and 21 must bear against the surfaces of the continuous web 3 while exerting a compressive force, so that the gap width SW must be dimensioned to be smaller than the thickness D of the continuous web 3. For this purpose, the pressing rollers 1 and 2 can additionally press the pressing belts 20 and 21 against the continuous web 3 and thus increase the compressive force exerted by the pressing belts 20 and 21.

Furthermore, the continuous web 3 to be laminated is provided, which runs through the gap S and has a thickness D. The continuous web 3 is formed by a "three-ply" continuous web 3 with a separator web 4 on the upper side and a separator web 6 on the lower side and anodes 5 arranged in between. The anodes 5 are arranged with intermediate spaces 8 at identical intervals A from each other and have a smaller width than the separator webs 4 and 6, so that the separator webs 4 and 6 project laterally beyond the anodes 5.

A plurality of cooling or heating segments 23 are provided in the two pressing surfaces 23 and 24 of the pressing rollers 1 and 2 in the embodiment of FIG. 1 or of the pressing belts 20 and 21 in the embodiment of FIG. 2, which segments can be controlled individually or in groups and enable a different temperature control of the pressing surfaces 24 and 25 of the pressing rollers 1 and 2 or of the pressing belts 20 and 21 with respect to one another.

Thus, the upper pressing roller 2 or the upper pressing belt 21, which comes into contact with the upper separator web 4 covering the anodes 5, i.e., on the anode side of the continuous web 3, can have a temperature in its pressing surface 24 of 50 degrees Celsius, while the lower pressing roller 2 or the lower pressing belt 20, which comes into contact with the lower sides of the cathodes 7, i.e., on the cathode side of the continuous web 3, can have a temperature in its pressing surface 23 of 20 degrees Celsius. Thus, the pressing surfaces 24 and 25 have a temperature difference of 30 degrees Celsius, the pressing surface 23 on the anode side deliberately having a higher temperature and thus heating the continuous web 3 on the anode side more than the pressing surface 24 on the cathode side of the continuous web 3.

The temperature gradient between the pressing surfaces 24 and 25 can be controlled or regulated by controlling or regulating the temperature of the cooling or heating segments 23, so that the temperature gradient can be adapted to different anodes and cathodes and in particular their different combinations. For example, the adjustment may the thickness of the conductor foils of the anodes, usually made of copper, and the cathodes, usually made of aluminum, which the thicknesses of the anodes and cathodes are adapted as a whole as well as to the materials of the anodes and cathodes, conductor foil and active material. In the present embodiment, the cooling or heating segments 23 are arranged in both pressing surfaces 25 and 24, so that the temperature difference between the pressing surfaces 25 and 24 can be realized by actively changing the temperature of both pressing surfaces 25 and 24. In order to achieve the temperature difference, it would also be conceivable, however, to provide cooling or heating segments 23 only in one of the pressing surfaces 24 or 25 and to heat or cool only one of the pressing surfaces 24 or 25 accordingly.

Furthermore, a plurality of individually controllable cooling or heating segments 23 arranged spaced apart from one another can also be provided in the pressing surfaces 24 and 25, so that the pressing surfaces 24 and 25 can also have different temperatures only in portions. In this way, for example different thermal expansions of the continuous web 3 in the direction of its longitudinal extension on the anode side and/or the cathode side can be taken into account. For example, the thermal expansion of the continuous web 3 in the region of the anodes 5 and the intermediate spaces 8 provided therebetween is different from the thermal expansion in the region of the cathodes 7 and the intermediate spaces 8 provided therebetween, which is in particular due to the larger spacings A between the cathodes 7 and the smaller spacings A between the anodes 5 in the intermediate spaces 8. By means of the cooling or heating segments 23, the pressing surfaces 24 and 25 can be heated to a lesser extent for example in the portions with which they come into contact with the portions of the continuous web 3 with the greater thermal expansion in the region of the centers of the anodes 5 and the centers of the cathodes 7, than in the portions with which they come into contact in the region of the intermediate spaces 8. This results in different temperatures for the pressing surfaces 24 and 25 along their longitudinal extension and/or development in the form of a regular alternation of zones of higher temperature and lower temperature. In this case, the lengths of the zones with the lower temperature depend on the length of the anodes 5 and the length of the cathodes 7, while the length of the zones with the higher temperature depends on the length of the intermediate spaces 8. Thus, for the lamination of the continuous web 3, different temperature zones result in the corresponding pressing surfaces 24 and 25 in a distribution and dimensioning individually adapted to the corresponding distribution of the thermal expansion in the anode side and/or the cathode side of the continuous web 5.

Furthermore, the pressing surfaces 24 and 25 can also be temperature controlled differently in the edge portions with which they come into contact with the edge portions of the continuous web 3 that are laterally adjacent to the anodes 5 and the cathodes 7 and run in the longitudinal direction of the continuous web 3, by arranging and controlling individual cooling or heating segments 23. Overall, the pressing surfaces 24 and 25 of the pressing rollers 1 and 2 and/or the pressing belts 20 and 21 can be individually temperature controlled by the arrangement of the cooling or heating segments 23 in such a way that the lamination of the continuous web 3 takes place with a heat distribution in the pressing surfaces 24 and 25 that is individually tailored to the specific distribution of the thermal expansion in the continuous web 3, whereby ideally a laminated, curvature-free continuous web 3 can be realized after exiting the laminating apparatus.

Of course, pressing belts 20 and 21 with differently temperature-controlled pressing surfaces 24 and 25 can also be combined with pressing rollers 1 and 2 with differently temperature controlled pressing surfaces 24 and 25.

In this case, the cooling or heating segments 23 in the pressing surfaces 24 and 25 are preferably integrated into the pressing surfaces 24 and 25 in such a way that the pressing surfaces 24 and 25 are formed homogeneously and in a stepless manner.

Furthermore, in addition to or instead of the cooling or heating segments 23 in the pressing surfaces 24 and 25, zones with different thermal conductivity coefficients can also be provided in the pressing surfaces 24 and 25. In this case, central heat sources or heat sinks can be assigned to the pressing belts 20 and 21 and/or the pressing rollers 1 and 2, which, in conjunction with the zones of different thermal conductivity coefficients, bring about different temperature control of the pressing surfaces 24 and 25.

The invention claimed is:

1. A laminating apparatus for a multilayer continuous web composed of at least one separator web and at least one electrode for producing energy cells, comprising:

a pressing device which laminates the multilayer continuous web by exerting a compressive force, wherein the pressing device has two pressing surfaces with which it comes into contact with different sides of the continuous web, and the pressing surfaces are temperature-controlled differently.

2. The laminating apparatus according to claim 1, wherein a plurality of cut electrodes arranged at regular intervals from each other are provided in the continuous web.

3. The laminating apparatus according to claim 2, wherein the continuous web has at least two separator web, and the electrodes are formed by a plurality of anodes arranged in series and a plurality of cathodes arranged in series, which are separated from one another by one of the separator webs, the pressing surface which comes into contact on the side of the continuous web assigned to the cathodes has a lower temperature than the pressing surface which comes to rest on the side of the continuous web associated with the anodes.

4. The laminating apparatus according to claim 1, wherein the pressing surfaces have a temperature of −40 to 150 degrees Celsius, preferably of 55 to 80 degrees Celsius.

5. The laminating apparatus according to claim 1, wherein the pressing surfaces have a temperature difference of 20 to 60 degrees Celsius.

6. The laminating apparatus according to claim 1, wherein individually temperature-controllable heating segments or cooling segments are provided in the pressing surfaces.

7. The laminating apparatus according to claim 1, wherein the pressing surfaces have different thermal conductivity coefficients.

8. The laminating apparatus according to claim 1, wherein the pressing surfaces have different heat capacities.

9. The laminating apparatus according to claim 1, wherein the pressing device comprises two pressing rollers having a circular cross section, and the pressing surfaces are formed by the lateral surfaces of the pressing rollers.

10. The laminating apparatus according to claim 9, wherein the pressing rollers are arranged such that a gap is provided between their lateral surfaces, through which the continuous web runs, and the gap has a gap width which is smaller than the thickness of the continuous web.

11. The laminating apparatus according to claim 9, wherein the pressing rollers are cylindrical with an identical diameter in the direction of their longitudinal axis.

12. The laminating apparatus according to claim 9, wherein the pressing rollers are arranged such that their axes of rotation are aligned parallel to each other.

13. The laminating apparatus according to claim 1, wherein the pressing device has at least one pressing belt, and the pressing surface is formed by a surface of the pressing belt which comes into contact with one of the surfaces of the continuous web.

14. The laminating apparatus according to claim 13, wherein at least two pressing belts, each with a pressing surface, are provided.

15. The laminating apparatus according to claim 9, wherein the pressing rollers rest on the free surface of the pressing belts and press the pressing belts against the continuous web by exerting a compressive force.

16. The laminating apparatus according to claim 1, wherein the pressing surface is adjustable in width.

17. The laminating apparatus according to claim 1, wherein the pressing surface has a width which corresponds to the width of the continuous web or a multiple thereof.

18. The laminating apparatus according to claim 13, wherein the pressing rollers rest on the free surface of the pressing belts and press the pressing belts against the continuous web by exerting a compressive force.

* * * * *